Patented Oct. 22, 1935

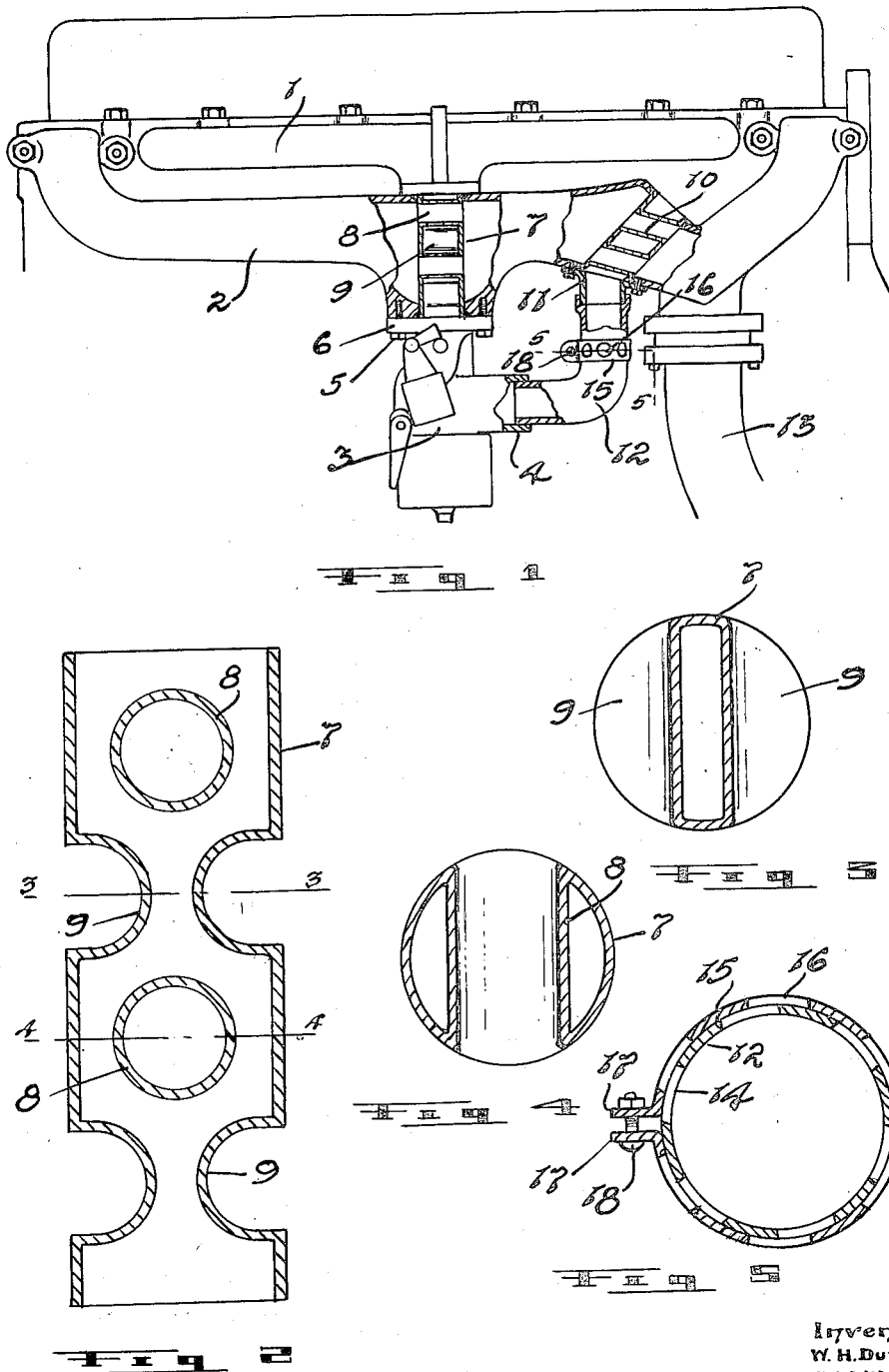

2,018,122

UNITED STATES PATENT OFFICE 2,018,122

AIR AND MIXTURE HEATER FOR GASIFIERS

William H. Duthoit, Winnipeg, Manitoba, and George W. Wallace, Transcona, Manitoba, Canada Application July 31, 1933, Serial No. 683,058

3 Claims. (Cl. 261—13)

The invention relates to improvements in air pre-heaters and firing mixture gasifiers and an object of the invention is to provide a device which when in use on an automobile or such like internal combustion engine, will pre-heat the air passing to the carburetor and will effectively heat the firing mixture passing from the carburetor to the intake manifold so that the firing mixture or charge will be in a particularly effective condition for firing purposes in the engine cylinders.

A further object of the invention is to construct the device so that it can be readily installed on existing engines without requiring any material alteration in their construction and which also can be supplied at relatively small cost.

A further object of the invention is to arrange the device so that the exhaust gases are used for heating purposes and such that exterior cold air can be admitted when desired in regulated quantities to mix with the hot air passing to the carburetor, such latter being beneficial in summer time.

A further object is to arrange the conduits used so that a relatively large exhaust gas heating area is provided to heat the material passed through the conduit and also to design the conduit such that the material passed therethrough will be not only effectively heated by the exhaust gases but will be also thoroughly mixed.

With the above more important objects in view, the invention consists essentially in the arrangement and construction of parts hereinafter more particularly described, reference being had to the accompanying drawing, in which:—

Fig. 1 is a side view of the upper portion of an internal combustion engine equipped with our invention, certain parts being torn away and other parts in vertical section.

Fig. 2 is an enlarged detailed sectional view centrally through one of the conduits used.

Fig. 3 is a horizontal sectional view at 3—3 Figure 2.

Fig. 4 is a horizontal sectional view at 4—4 Figure 2.

Fig. 5 is an enlarged detailed horizontal sectional view at 5—5 Figure 1.

In the drawing like characters of reference indicate corresponding parts in the several figures.

The internal combustion engine is provided with a customary inlet manifold 1, exhaust manifold 2 and carburetor 3, the inlet manifold in the present instance being shown as positioned directly above the exhaust manifold as is at present common construction on existing automobiles.

The carburetor is supplied with the usual air inlet pipe 4 and has the upper end thereof fastened by bolts 5 through the flange 6 with the exhaust manifold, this also being common practice.

In equipping an engine with our invention, we provide a conduit 7 herein shown as in the form of a pipe which conduit passes vertically and centrally through the exhaust manifold having its ends suitably secured as by welding to the top and bottom walls of the manifold. The lower end of the conduit communicates with the upper end of the carburetor and the upper end of the conduit opens to the intake manifold so that the firing mixture is passed from the carburetor to the intake manifold through the conduit which latter it will be observed is contained within the exhaust manifold where it is subjected to the heat of the passing exhaust gases.

It is extremely desirable that the firing mixture passing through the conduit be thoroughly mixed and heated and to this end, we pass horizontally disposed spaced tubes 8 centrally through the conduit and have pairs of partial tubes 9 inset in the sides of the conduit, the tubes 9 being alternated with tubes 8 in the manner best shown in Figure 2.

According to this arrangement, the firing mixture passing upwardly through the conduit is effectively mixed within the conduit and a relatively large exterior area is provided so that the exhaust gases can effectively heat the firing mixture in its passage as obviously the firing mixture will pass through the tubes 8 and partial tubes 9 and will sweep past the conduit as a whole. Accordingly the firing mixture is effectively gasified when it enters the intake manifold.

We provide in the exhaust manifold a further conduit 10 which is constructed in the same manner as the conduit 7 and has the ends thereof firmly secured as by welding to the upper and lower walls of the manifold. To the under side of the manifold, we fasten securely in any suitable manner a short pipe 11 which communicates with the lower end of the conduit 10. We then supply an elbow 12 which has its upper end telescoped over the lower end of the pipe 11 and its lower end telescoped within the air inlet pipe 4 to the carburetor.

The upper end of the pipe 10 opens to atmospheric air and accordingly the air fed to the carburetor is passed through the conduit 10 and the elbow 12 and is pre-heated before being admitted to the carburetor, the pre-heating being done by the exhaust gases passing through the exhaust manifold to the exhaust pipe 13.

It may be desirable such as in the summertime to cool the air passing to the carburetor and in order to permit of this, we have provided the elbow with a series of air inlet holes 14 and have placed a strap 15 around the elbow, the strap having holes 16 which can be brought into registration with those 14.

The ends of the strap are fitted with lugs 17 connected by a bolt 18 and obviously one can release the bolt and set the strap as he desires and then tighten up the bolt to hold it in the set position. For winter driving, the strap would be set with the holes 14 and 16 out of registration and for summer driving the said holes can be set as experience best dictates.

It will be apparent that these conduits can be manufactured at relatively small cost and can be very easily and quickly installed on the exhaust manifold and connected up in the manner shown with the carburetor and intake manifold.

When in use, the air admitted to the carburetor through the air inlet pipe 4 is effectively pre-heated by the exhaust gases and the firing mixture passing from the carburetor to the intake manifold through the conduit 7 is thoroughly mixed and heated so that it is effectively gasified when it is admitted to the intake manifold.

What we claim as our invention is:—

1. The combination with the carburetor and the intake and exhaust manifolds of an internal combustion engine, of a transverse fuel intake conduit passing through the exhaust manifold and connecting the carburetor with the intake manifold, said conduit having spaced tubes passing centrally therethrough and inset portions upon the sides thereof and alternated with the tubes, said tubes and inset portions forming passages through the conduit for the exhaust gases and also forming internal deflectors for mixing the firing mixture passing through the conduit from the carburetor to the intake manifold.

2. The combination with a carburetor, the intake and exhaust manifold of an internal combustion engine, of a pair of similar conduits passing transversely through the exhaust manifold and both having transverse passages therethrough for the exhaust gases and one of said conduits connecting the carburetor with the intake manifold and the other of said conduits having one end connected to the air intake pipe of the carburetor and the other end open to atmospheric air.

3. The combination with the carburetor and the intake and exhaust manifolds of an internal combustion engine, of an intake conduit situated transversely within the exhaust manifold and connecting the carburetor with the intake manifold, said conduit being of a predominantly cylindrical formation having a plurality of depressions upon its exterior wall throughout its length and transverse passages therein, said depressions and transverse passages constituting additional heat absorbing surface and baffling surface for fuel sucked upwardly within said intake conduit.

WILLIAM H. DUTHOIT.
GEORGE W. WALLACE.